(12) United States Patent
Bamber et al.

(10) Patent No.: US 9,423,046 B2
(45) Date of Patent: Aug. 23, 2016

(54) FLUX COLLECTOR WITH INTERCONNECTED PORTIONS AND METHOD OF MANUFACTURING SOLENOID VALVE ASSEMBLY HAVING SAME

(71) Applicant: Eaton Corporation, Cleveland, OH (US)

(72) Inventors: Daniel Bamber, Farmington Hills, MI (US); Robert Dayton, Attica, MI (US)

(73) Assignee: Eaton Corporation, Cleveland, OH (US)

( * ) Notice: Subject to any disclaimer, the term of this patent is extended or adjusted under 35 U.S.C. 154(b) by 72 days.

(21) Appl. No.: 14/378,460

(22) PCT Filed: Feb. 20, 2013

(86) PCT No.: PCT/US2013/026829
§ 371 (c)(1),
(2) Date: Aug. 13, 2014

(87) PCT Pub. No.: WO2013/130316
PCT Pub. Date: Sep. 6, 2013

(65) Prior Publication Data
US 2015/0048270 A1    Feb. 19, 2015

Related U.S. Application Data

(60) Provisional application No. 61/604,081, filed on Feb. 28, 2012.

(51) Int. Cl.
| | |
|---|---|
| *F16K 31/06* | (2006.01) |
| *H01F 7/08* | (2006.01) |
| *B23P 15/00* | (2006.01) |
| *H01F 3/00* | (2006.01) |

(52) U.S. Cl.
CPC .......... *F16K 31/0675* (2013.01); *B23P 15/001* (2013.01); *H01F 3/00* (2013.01); *H01F 7/081* (2013.01); *Y10T 29/49412* (2015.01); *Y10T 29/49416* (2015.01)

(58) Field of Classification Search
CPC .... F16K 31/02; F16K 31/06; F16K 31/0603; F16K 31/0644; F16K 31/0655; F16K 31/0675; H01F 3/00; H01F 7/081; H01F 7/1607; H01F 2007/086
USPC ............................. 251/129.15; 335/262, 281
See application file for complete search history.

(56) References Cited

U.S. PATENT DOCUMENTS 5,178,186 A * 1/1993 Levasseur .................... 137/556
6,003,839 A * 12/1999 Kobayashi ............... 251/129.15
(Continued)

FOREIGN PATENT DOCUMENTS

| CN | 1520002 A | 8/2004 |
|---|---|---|
| CN | 1762747 A | 4/2006 |

(Continued)

*Primary Examiner* — Matthew W Jellett
(74) *Attorney, Agent, or Firm* — Quinn Law Group, PLLC

(57) ABSTRACT

An apparatus such as for a solenoid valve assembly includes a substantially annular flux collector (12) that has a first arced portion (10) and at least one additional arced portion (14). The first arced portion and the at least one additional arced portion are cooperatively configured to interlock with one another to form the substantially annular flux collector. A method (200) of manufacturing a solenoid valve assembly using the annular flux collector is also provided.

20 Claims, 7 Drawing Sheets

(56) References Cited

U.S. PATENT DOCUMENTS

| | | | |
|---|---|---|---|
| 6,164,562 A | 12/2000 | Wu | |
| 6,453,943 B1 | 9/2002 | Chang | |
| 6,945,510 B2* | 9/2005 | Dralyuk | 251/129.15 |
| 7,041,217 B1* | 5/2006 | Close et al. | 210/232 |
| 7,051,993 B2* | 5/2006 | Kim et al. | 251/129.15 |
| 7,131,634 B2* | 11/2006 | Yang | 251/129.15 |
| 2001/0048259 A1* | 12/2001 | Ueda | 310/154.09 |
| 2005/0199846 A1 | 9/2005 | Kim et al. | |
| 2008/0216899 A1* | 9/2008 | Moreno et al. | 137/219 |
| 2009/0025808 A1 | 1/2009 | Kacik et al. | |
| 2010/0084590 A1* | 4/2010 | Dayton et al. | 251/129.15 |
| 2010/0180968 A1 | 7/2010 | Heerklotz | |
| 2010/0264341 A1* | 10/2010 | Kratzer | 251/129.15 |
| 2012/0085444 A1 | 4/2012 | Bollo | |
| 2012/0168655 A1* | 7/2012 | Chuang | 251/129.15 |
| 2013/0154397 A1* | 6/2013 | Sullivan | 310/12.18 |

FOREIGN PATENT DOCUMENTS

| | | |
|---|---|---|
| CN | 101929363 A | 12/2010 |
| CN | 203322446 U | 12/2013 |
| DE | 3105652 A1 | 9/1982 |
| EP | 1647460 A1 | 4/2006 |
| EP | 1659321 A1 | 5/2006 |
| EP | 1679461 A1 | 7/2006 |
| WO | 9101585 A1 | 2/1991 |
| WO | 2004055956 A2 | 7/2004 |

\* cited by examiner

FLUX COLLECTOR WITH INTERCONNECTED PORTIONS AND METHOD OF MANUFACTURING SOLENOID VALVE ASSEMBLY HAVING SAME

TECHNICAL FIELD

The present teachings generally include a flux collector and a method of manufacturing a solenoid valve assembly having a flux collector.

BACKGROUND

Solenoid valves sometimes have a coil that can carry current to create an electromagnetic flux field, causing movement of an armature within the valve. Flux collectors are sometimes placed adjacent the coil around the armature to collect the flux, thereby directing the magnetic field to aid in movement of the armature.

SUMMARY

An apparatus such as for a solenoid valve assembly includes a substantially annular flux collector that has a first arced portion and at least one additional arced portion. The first arced portion and the at least one additional arced portion are cooperatively configured to interlock with one another to form the substantially annular flux collector.

The annular flux collector can be used in a solenoid valve assembly that has a valve body with a groove on an outer surface of the valve body. The first arced portion and the at least one additional arced portion are cooperatively configured to interlock with one another to form the substantially annular flux collector when inserted into the groove to surround the valve body at the groove. A movable armature is inside of the valve body radially inward of the flux collector.

A method of manufacturing a solenoid valve assembly includes inserting the arced portions of the flux collector into an external groove of a valve body such that the arced portions interlock with one another to encircle the valve body at the groove and form an annular flux collector. The valve body can be turned, with the groove cut into an external surface of the valve body. The annular flux collector thus need not be cast integrally with the valve body.

The above features and advantages and other features and advantages of the present teachings are readily apparent from the following detailed description of the best modes for carrying out the present teachings when taken in connection with the accompanying drawings.

DETAILED DESCRIPTION

Figure 1:
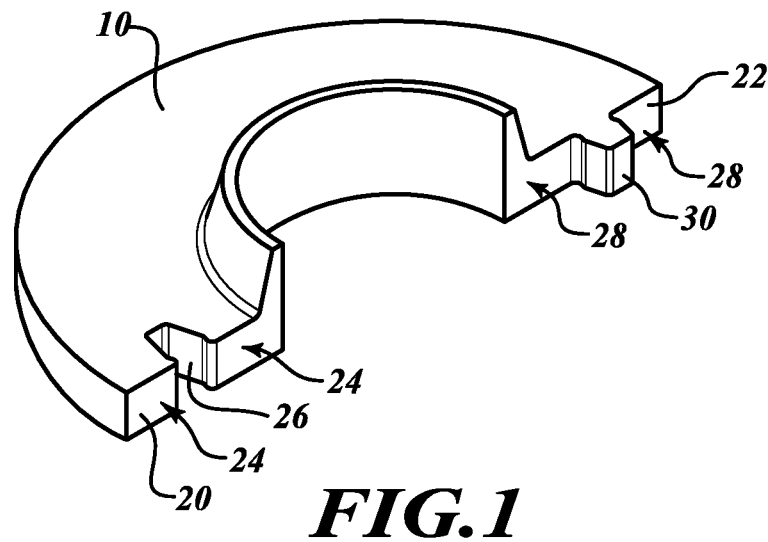
FIG. 1 is a schematic illustration in perspective view of an arced portion of an annular flux collector.
Figure 2:
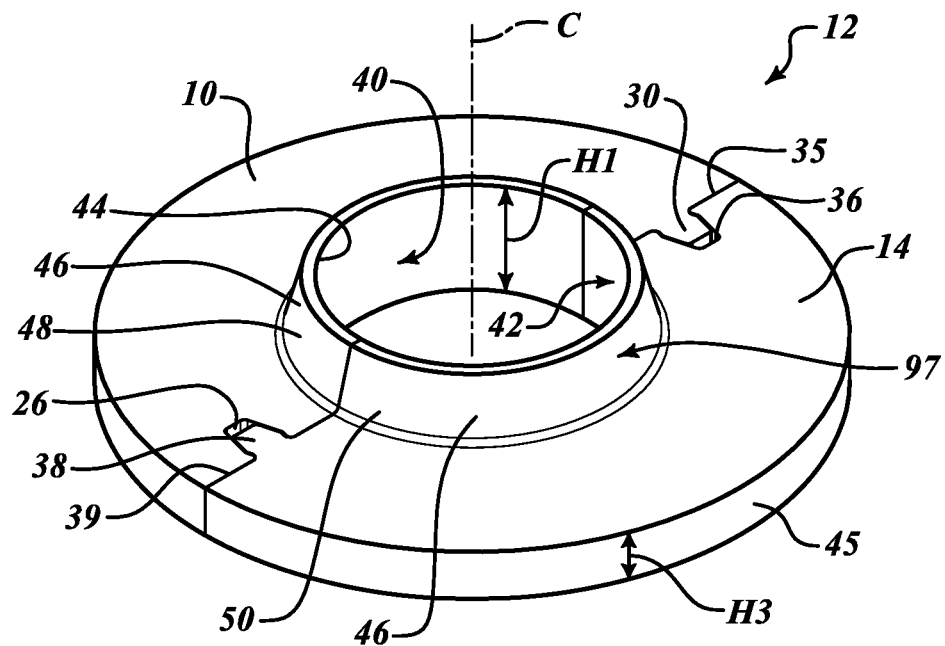
FIG. 2 is a schematic illustration in perspective view of an annular flux collector formed by the arced portion of FIG. 1 interlocked with another arced portion.

Referring to the drawings, wherein like reference numbers refer to like components throughout the several views, FIG. 1 shows a first arced portion 10 of an apparatus referred to as an annular flux collector 12, shown in FIG. 2. As shown in FIG. 2, the first arced portion 10 is configured to interlock with a second arced portion 14 to form the annular flux collector 12. Although only two arced portions 10, 14 form the annular flux collector 12, within the scope of the present teachings, three or more arced portions could be configured to interlock with one another to form the annular flux collector. The arced portions 10, 14 can be steel or any other material capable of being magnetized to carry magnetic flux.

Figure 6:
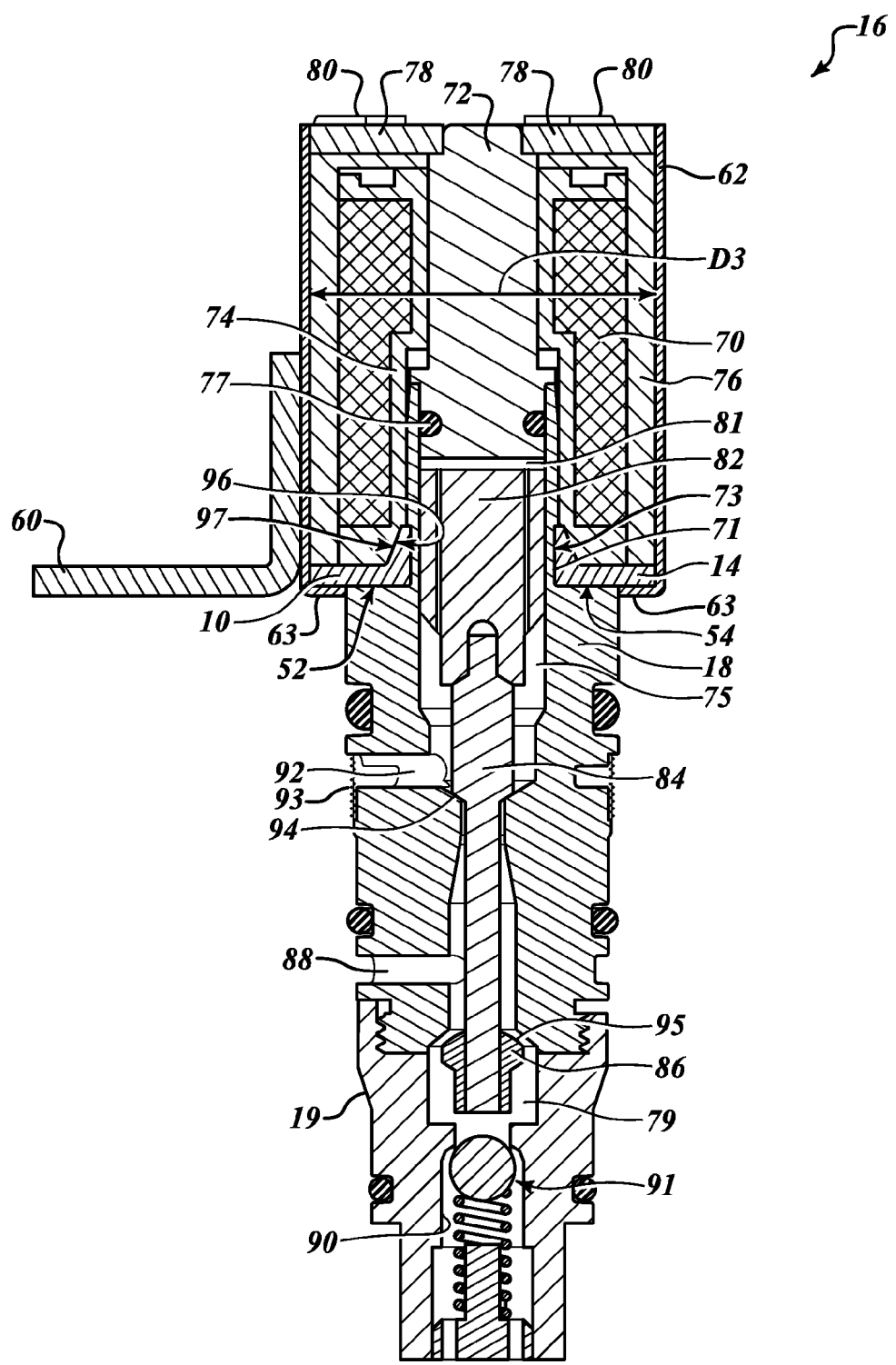
FIG. 6 is a schematic cross-sectional illustration of a solenoid valve assembly including the annular flux collector of FIG. 2, taken at lines 6-6 in FIG. 7.

The annular flux collector 12 can be used in a solenoid valve assembly 16 shown in FIG. 6, although its use is not limited to a solenoid valve assembly. As explained herein, the configuration of the annular flux collector 12 enables the use of a turned valve body 18, although a cast valve body or a valve body made according to a different process may instead be used. One method 200 of manufacturing the solenoid valve assembly 16 is described with respect to a flow diagram in FIG. 12, and is discussed herein.

The first arced portion 10 shown in FIG. 1 has a first end 20 with a first shape and a second end 22 with a second shape. Specifically, the first shape of the first end 20 is defined by a first radially-extending surface 24 with a first feature, such as a slot 26 extending from the surface 24. The second shape of the second end 22 is defined by a second radially-extending surface 28 with a second feature, such as a protrusion 30 extending from the surface 28.

The slot 26 and the protrusion 30 are one example of first and second features that may be used within the scope of the present teachings. The shapes of the first and second ends 20, 22 of the first arced portion 10 may be defined by other first and second features, respectively, that are designed to interlock with one another.

Figure 3:
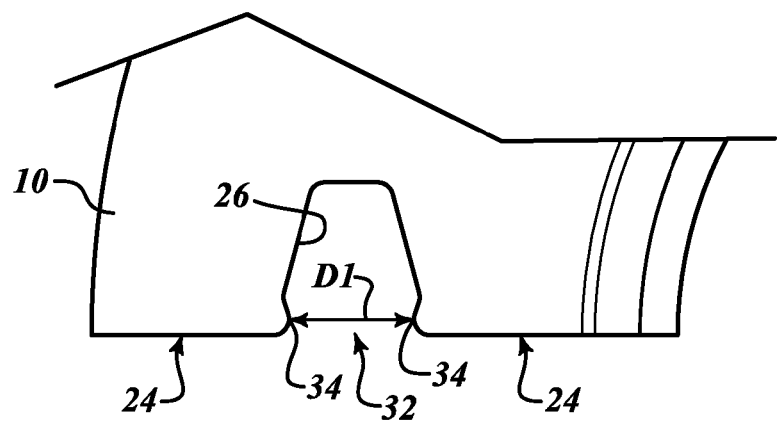
FIG. 3 is a schematic illustration in fragmentary plan view of a slot of the arced portion of FIG. 1.
Figure 4:
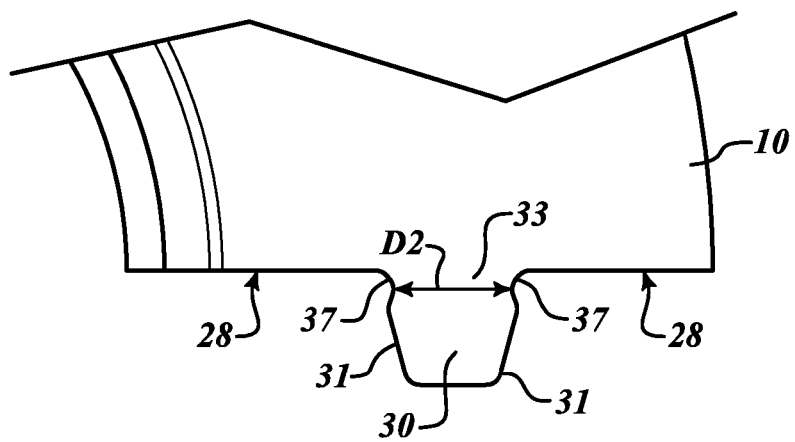
FIG. 4 is a schematic illustration in fragmentary plan view of a protrusion of the arced portion of FIG. 1.

FIG. 3 shows the slot 26 has an opening 32 with projections 34 extending inward at the opening 32 such that the slot 26 is narrowed at the opening 32 by the projections 34. FIG. 4 shows the protrusion 30 has flared sides 31 and a tapered neck 33 that forms the notches 37 at the surface 28. The slot 26 and the protrusion 30 are cooperatively configured so that a distance D1 of the narrowest portion between the projections 34 is substantially equal to a width D2 of the narrowest portion of the tapered neck 33.

FIG. 2 shows that the second arced portion 14 has an end 35, referred to as a third end, with a third shape partially defined by a third feature that is a slot 36. The second arced portion 14 has another end 39, referred to as a fourth end with a fourth shape partially defined by a fourth feature that is a protrusion 38. In the embodiment shown, the second arced portion 14 is substantially identical to the first arced portion 10. Accordingly, the third shape of the third end 35 is substantially identical to the first shape of the first end 20 and the fourth shape of the fourth end 39 is substantially identical to the second shape of the second end 22. The slot 36 has an opening and projections as described with respect to the slot 26. The protrusion 38 has flared sides and a tapered neck as described with respect to the protrusion 30.

As shown in FIG. 2, the protrusion 30 is configured to fit within the slot 36 when pressed into the slot 36 with sufficient force to cause the flared sides 31 to slide past the projections 34 so that the projections 34 rest in the notches 37 of the tapered neck 33. This locks the protrusion 30 within the slot 36 and interlocks the first arced portion 10 and the second arced portion 14. At the same time, the protrusion 38 is similarly pressed into the slot 26, locking the protrusion 38 into the slot 26 and further interlocking the first arced portion 10 and the second arced portion 14. The protrusion 30 can be pressed into the slot 36 in a direction substantially perpendicular to a center axis C of the assembled annular flux collector 12. The force required to press the protrusions 30, 38 into the slots 26, 36 can cause mechanical deformation of either or both of the protrusions 30, 38 and the slots 26, 36. Specifically, the projections 34 can be at least slightly deformed when the flared sides 31 are forced past the projections 34.

Figure 5:
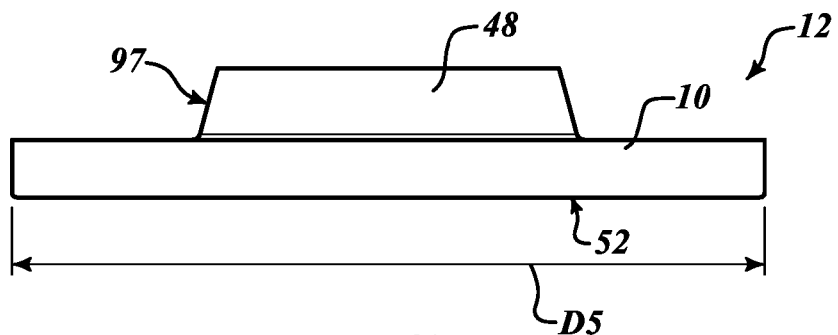
FIG. 5 is a schematic illustration in front view of the first arced portion of FIG. 1.

The first arced portion 10 has an inner arced surface 40 and the second arced portion 14 has an inner arced surface 42. When the arced portions 10, 14 are interlocked, the inner arced surfaces 40, 42 together define an inner periphery 44 of the flux collector 12. The first arced portion 10 and the second arced portion 14 each extend in an axial direction (upward along axis C in the view of FIG. 2) to define a collar 46 when the arced portions 10, 14 are interlocked. The collar 46 has a first collar portion 48 of the first arced portion 10 and a second collar portion 50 of the second arced portion 14. The collar 46 has a height H1 along the axis C at the inner periphery 44. A surface 52 of the first arced portion 10 opposite the collar 46 and a surface 54 of the second arced portion 14 opposite the collar 46 are both substantially flat, as best shown in FIGS. 5 and 6. The height H1 is greater than a height H3 of the flux collector 46 at an outer periphery 45 of the flux collector 12.

FIG. 6 shows the solenoid valve assembly 16 supported on a mounting bracket 60. For example, the mounting bracket 60 can be secured to a camshaft cover on an engine when the solenoid valve is used as an oil control valve retarding or advancing engine timing. The mounting bracket 60 is welded to a valve housing 62 that contains the flux collector 12 as described herein.

Figure 11:
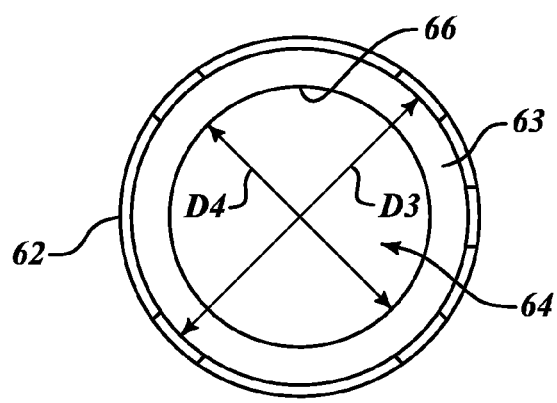
FIG. 11 is a schematic plan view of a valve housing of the solenoid valve of FIG. 6.

As shown in FIG. 11, the valve housing 62 is hollow, with an inner cavity 64 that has an inner diameter D3. The valve housing 62 has a central opening 66 at one end. The central opening 66 has a second inner diameter D4 that is smaller than the inner diameter D3 so that the valve housing 62 forms a flange 63 that extends radially inward around the central opening 66. FIG. 6 shows a coil 70, a pole piece 72 and a bobbin 74 that are packaged within the valve housing 62, along with the annular flux collector 12. The flux collector 12 is fit within a groove 71 formed on an outer surface 73 of the valve body 18 as described herein. The bobbin 74 is over-molded by injection molding with mold portion 76. The bobbin 74 surrounds the coil 70. The pole piece 72 is press-fit or otherwise secured within the bobbin 74 and is fit within a columnar cavity 75 in the valve body 18 and secured by a seal 77. A cap 78 is placed over the bobbin 74 and around the pole piece 72. The valve housing 62 is formed with integral securing tabs 80 at an end of the housing 62. The tabs 80 are shown in a pre-assembly or pre-crimped position 80A in phantom in FIG. 7.

FIG. 6 shows an armature 82 that is movable within the cavity 75 in response to electromagnetic flux. The pole piece 72, coil 70, flux collector 12 and armature 82 form an electromagnet. Lines of flux are created in an air gap 81 between the pole piece 72 and the armature 82 when the coil 70 is energized by an electric source (such as a battery, not shown). The armature 82 is movable within the cavity 75 defined by the valve body 18 in response to the flux created by energizing the coil 70. The flux collector 12 is positioned in close radial proximity to the armature 82 to enable the magnetic flux to ensure fast and accurate responsiveness of the armature 82 to energizing and deenergizing of the coil 70. A valve stem 84 is press-fit to the armature 82 and moves with the armature 82. A poppet 86 is fit to the end of the valve stem 84. An extension 19 is threaded to the valve body 18 and partially houses a distal end of the stem 84 in a cavity 79 that is in communication with the cavity 75.

The armature 82 is shown in a first position in which the coil 70 is deenergized. When the armature 82 is in the first position shown, a control passage 88 is in fluid communication with an exhaust passage 90 to allow fluid at a control pressure to exhaust through the valve body 18 when fluid force overcomes a ball check valve 91. A supply passage 92 is blocked from fluid communication with the exhaust passage 90 as the valve stem 84 is seated at a first valve seat 94. A wire mesh filter 93 covers the supply passage 92. The filter 93 is permeable to permit fluid to flow to the supply passage 92. When the coil 70 is energized, the armature 82 moves toward the pole piece 72, causing the valve stem 84 to also move upward until the poppet 86 is seated at a second valve seat 95. The supply passage 92 is then in fluid communication with the control passage 88, to direct fluid through the control passage 88. The supply passage 92 is not in fluid communication with the exhaust passage 90 when the coil 70 is energized.

Figure 7:
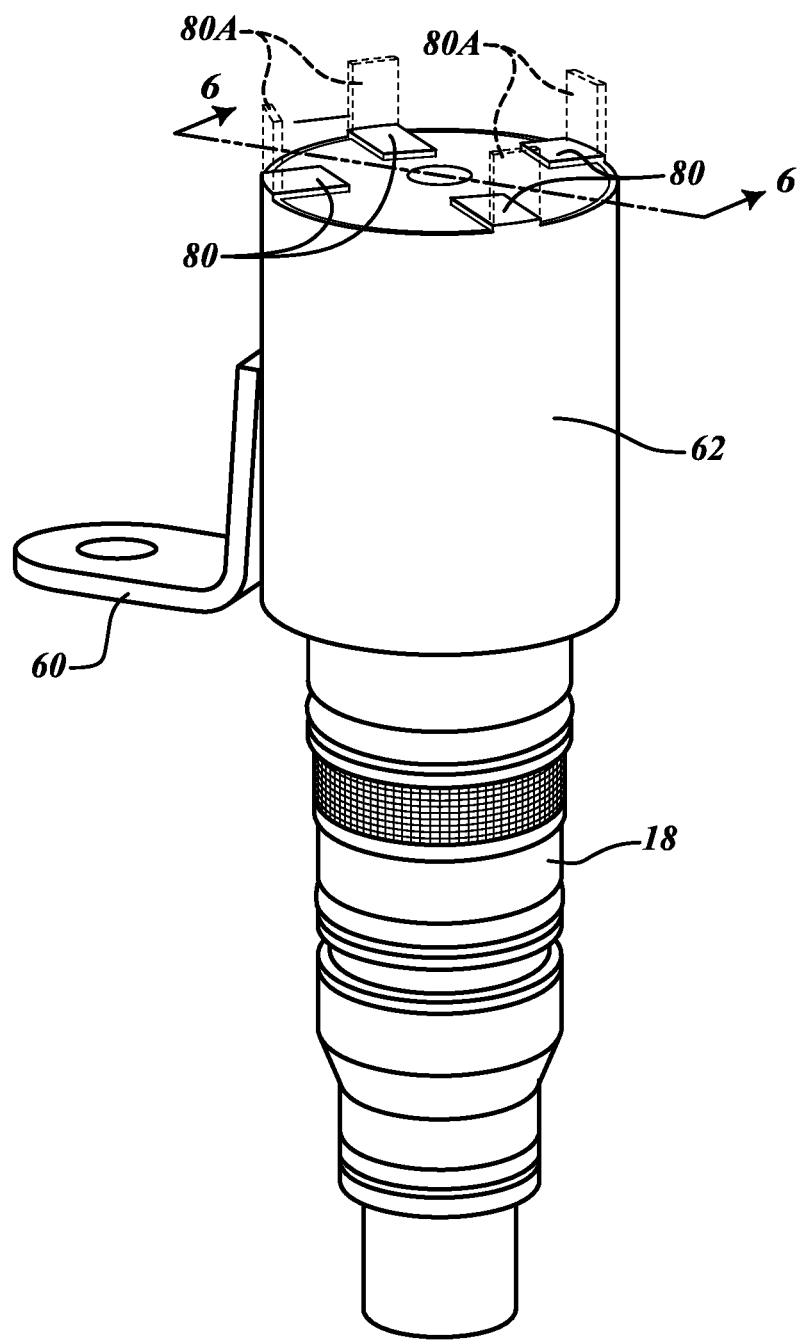
FIG. 7 is a schematic perspective illustration of the solenoid valve assembly of FIG. 6.

After the cap 78 is placed in the housing 62, the tabs 80 are crimped downward to the positions shown in FIGS. 6 and 7 to tightly secure the components within the valve housing 62. FIG. 6 shows that an inner surface 96 of the bobbin 74 has a shape that is complementary to an outer surface 97 of the flux collector 12. The extension of the collar 46 and contact with the bobbin 74 ensures that the collar 46 will have a moment arm to prevent the radially-outer portions of the flux collector 12 from rotating upward when the tabs 80 are crimped downward. This ensures that the flux collector 12 stays in position against the valve body 18, as close as possible in a radial direction to the armature 82.

Figure 8:
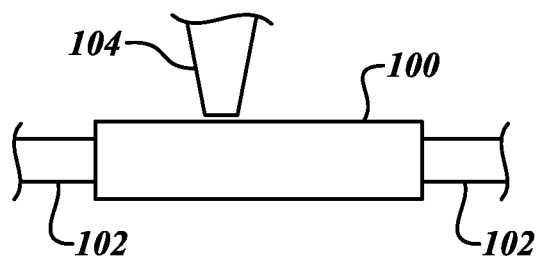
FIG. 8 is a schematic illustration of a work piece undergoing a turning operation to form a valve body of the solenoid valve assembly of FIGS. 6 and 7.
Figure 9:
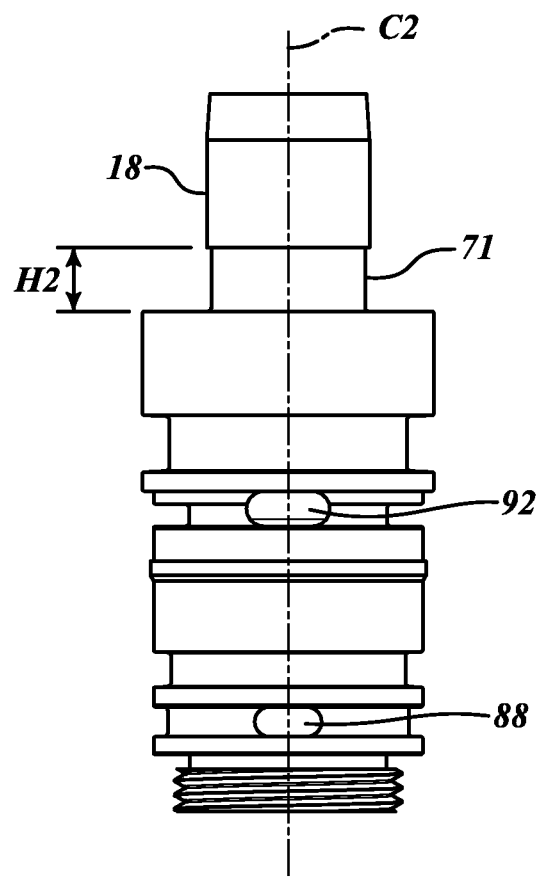
FIG. 9 is schematic side view illustration of the valve body of FIGS. 6 and 7 after the turning operation of FIG. 8 and showing a groove cut into an external surface.
Figure 10:
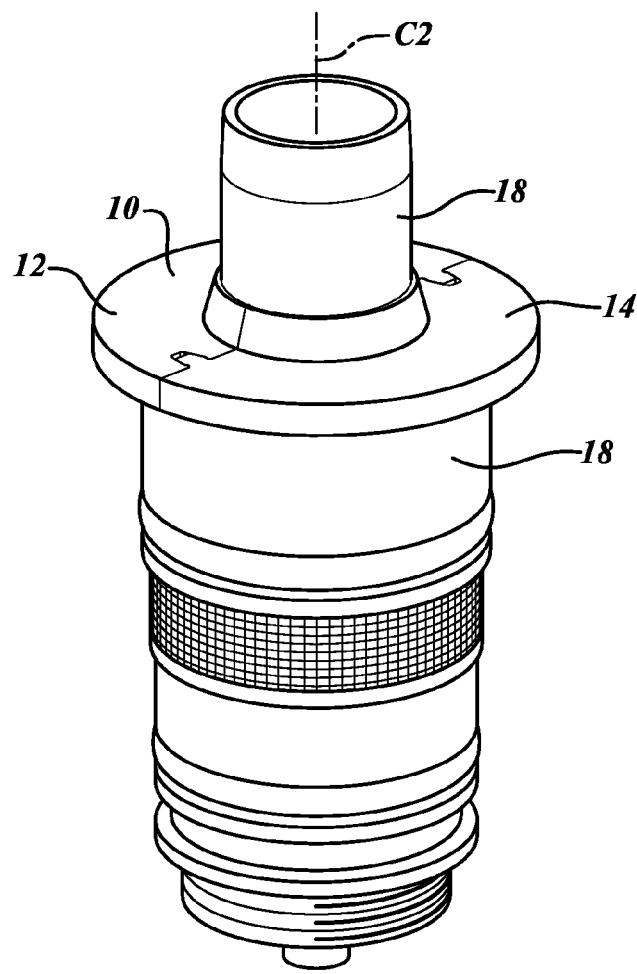
FIG. 10 is a schematic illustration in perspective view of a portion of the solenoid valve assembly of FIGS. 6 and 7, showing the flux collector placed in the groove on the valve body.

The flux collector 12 is configured to allow the valve body 18 to be separately manufactured rather than cast with a flux collector in the casting mold. Specifically, FIG. 8 shows a generally cylindrical aluminum work-piece 100 held in a machine tool such as a CNC lathe 102. The lathe 102 has a variety of computer-controlled cutting mechanisms used to form the valve body 18, shown in FIG. 9. A cutting tool 104 is used to cut and define the outer surface of the finished valve body 18, including the groove 71 in which the flux collector 12 is seated, as shown in FIGS. 6 and 10. FIG. 9 shows the finished valve body 18 with the groove 71 as well as the supply passage 92 and the control passage 88.

Figure 12:
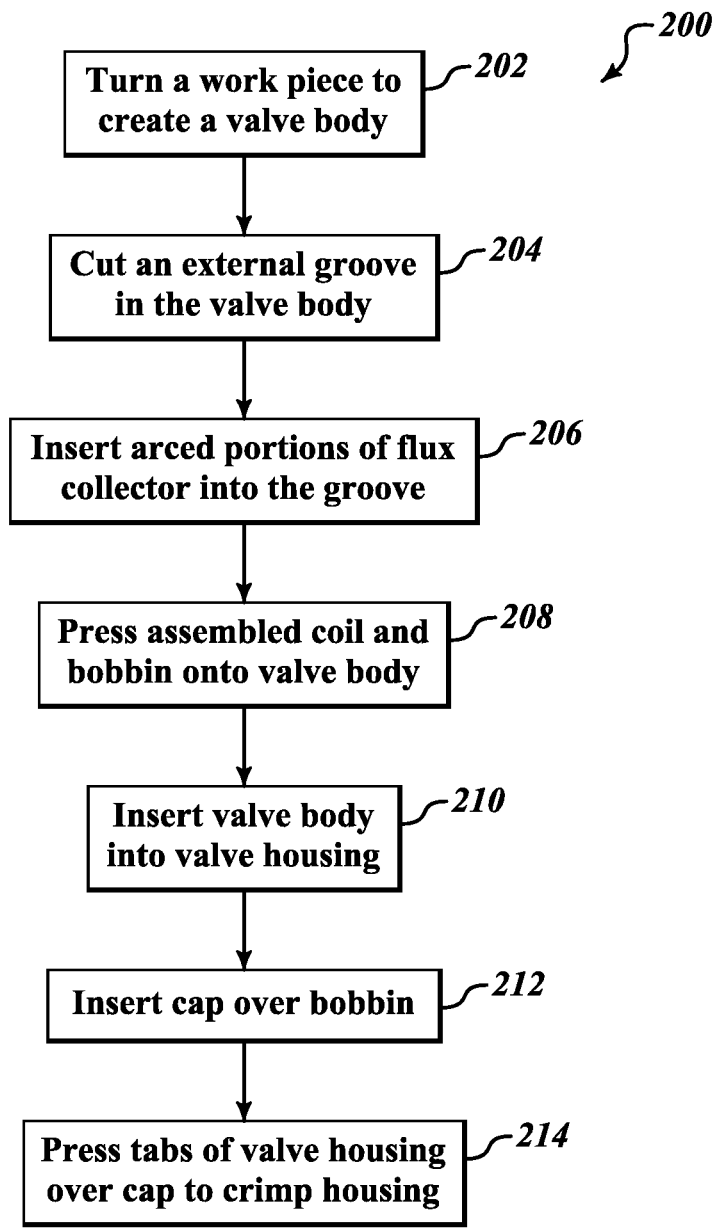
FIG. 12 is a flow diagram of a method of manufacturing the solenoid valve assembly of FIGS. 6 and 7.

FIG. 12 is a flow diagram of a method 200 of manufacturing the solenoid valve assembly 16 of FIG. 6. The method 200 begins with block 202 in which a generally cylindrical work-piece 100 is turned to create a valve body 18. In block 204, a groove 71 is cut in an external surface of the valve body 18. The arced portions 10, 14 of an annular flux collector 12 are then inserted into the groove 71 in block 206 to interlock the portions 10, 14 to one another to form the annular flux collector 12. The arced portions 10, 14 are inserted in a generally radially-inward direction into the groove 71, perpendicular to a center axis C2 of the valve body 18, shown in FIG. 10. An axial height H2 of the groove 71, shown in FIG. 9, is greater than the axial height H1 of the annular flux collector 12, shown in FIG. 2, so that the flux collector 12 can fit within the groove 71. Because the portions 10, 14 are designed to interlock, they cannot separate by vibrating radially-outward as they are handled prior to insertion into the valve housing 62. This ensures that the annular flux collector 12 will fit within the cavity 64. The outer diameter D5 of the annular flux collector 12 is only slightly less than the inner diameter D3 of the valve housing 62, so the prevention of radial separation enabled by the interlocked portions 10, 14 ensures that the flux collector 12 will be insertable into the valve housing 62. Any radially-outward propagation of the flux collector 12 could compromise the ability of the valve body 18 with attached flux collector 12 to fit into the valve housing 62.

In block 208 shown in FIG. 12, the assembled coil 70 and bobbin 74 are pressed onto the valve body 18. Next, in block 210, the valve body 18 with the flux collector 12, coil 70 and over-molded bobbin 74 are pressed into the housing 62. The valve body 18 will extend through the central opening 66, while the flux collector 12 will rest against the flange 63. In block 212, the cap 78 is then inserted over the over-molded bobbin 74. In block 214, the securing tabs 80 are pressed downward to crimp the valve housing 62 around the flux collector 12, coil 70 and bobbin 74.

The reference numbers used in the drawings and the specification along with the corresponding components or method steps is as follows:
10 first arced portion
12 annular flux collector
14 second arced portion
16 solenoid valve assembly
18 turned valve body
19 extension
20 first end of 10
22 second end of 10
24 radially-extending surface
26 slot
28 second radially-extending surface
30 protrusion
31 flared sides
32 opening
33 tapered neck
34 projections
35 end of 14 (third end)
36 slot
37 notches
38 protrusions
39 end of 14 (fourth end)
40 inner arced surface of 10
42 inner arced surface of 14
44 inner periphery
46 collar
48 first collar portion
50 second collar portion
52 surface
54 surface
60 mounting bracket
62 valve housing
63 flange
64 inner cavity
66 central opening
70 coil
71 groove
72 pole piece
73 outer surface
74 bobbin
75 columnar cavity
76 mold portion
77 seal
78 cap
79 cavity
80 security tabs
80A pre-crimped position
81 air gap
82 armature
84 valve stem
86 control passage
88 control passage
90 exhaust passage
91 ball check valve
92 supply passage
93 wire mesh filter
94 first valve seat
95 second valve seat
96 inner surface
97 outer surface
100 work-piece
102 lathe
104 cutting tool
200 method
202 turning step
204 cutting step
206 inserting arced portions step
208 pressing assembled coil and bobbin step
210 inserting valve body step
212 inserting cap step
214 pressing tabs step
H1 axial height of collar
H2 axial height of groove
D1 distance between projections
D2 width of tapered neck
D3 diameter of inner cavity of valve housing
D4 diameter of central opening of valve housing
D5 outer diameter of annular flux collector While the best modes for carrying out the many aspects of the present teachings have been described in detail, those familiar with the art to which these teachings relate will recognize various alternative aspects for practicing the present teachings that are within the scope of the appended claims.

The invention claimed is:

1. An apparatus comprising:
a flux collector having:
a first arced portion;
at least one additional arced portion; wherein the first arced portion and said at least one additional arced portion interlock with one another so that the flux collector is substantially annular;
wherein the first arced portion and said at least one additional arced portion each have an inner arced surface that partially defines an inner periphery of the flux collector when the arced portions are interlocked with one another;

wherein the first arced portion and said at least one additional arced portion each extend in one axial direction at said inner arced surface to define a collar when the arced portions are interlocked with one another; and wherein a height of the collar at the inner periphery is greater than a height of the flux collector at an outer periphery of the flux collector.

2. The apparatus of claim 1, wherein the first arced portion and said at least one additional arced portion interlock when the second arced portion is pressed into the first arced portion with sufficient force to mechanically deform either or both of the first arced portion and the second arced portion.

3. The apparatus of claim 1, wherein said at least one additional arced portion is a single, second arced portion that is substantially identical to the first arced portion.

4. The apparatus of claim 1, wherein first arced portion and the second arced portion each have a substantially flat surface opposite the collar.

5. The apparatus of claim 4, wherein the collar is tapered.

6. The apparatus of claim 3, wherein the first arced portion and the second arced portion each have a first feature at a first radially-extending surface of a first end and a second feature at a second radially-extending surface of a second end;

wherein the second feature of the second arced portion deforms the first arced portion at the first feature of the first arced portion and the second feature of the first arced portion deforms the second arced portion at the first feature of the second arced portion when the second feature of the second arced portion is pressed into the first feature of the first arced portion with sufficient force to thereby interlock the first arced portion and the second arced portion.

7. The apparatus of claim 6, wherein the first feature of the first arced portion and the first feature of the second arced portion are each a slot having projections extending inward at an opening of the slot; wherein the second feature of the first arced portion and the second feature of the second arced portion are each a protrusion; wherein the projections are deformed by the protrusions when the protrusions are pressed into the slot.

8. The apparatus of claim 7, wherein the protrusion has flared sides and a tapered neck; wherein a narrowest portion of the tapered neck has a width less than a width of a widest portion of the protrusion at the flared sides.

9. An apparatus comprising:
a valve body having a groove on an outer surface of the valve body;
a substantially annular flux collector having:
a first arced portion; and
at least one additional arced portion;
wherein the first arced portion and said at least one additional arced portion interlock with one another to form the substantially annular flux collector when inserted into the groove to surround the valve body at the groove;
wherein the first arced portion and said at least one additional arced portion each have an inner arced surface that partially defines an inner periphery of the flux collector when the arced portions are interlocked with one another;
wherein the first arced portion and said at least one additional arced portion each extend in one axial direction at said inner arced surface to define a collar when the arced portions are interlocked with one another;

wherein an axial height of the collar at the inner periphery is greater than an axial height of the flux collector at an outer periphery of the flux collector; and a movable armature inside of the valve body radially inward of the flux collector.

10. The apparatus of claim 9, wherein said at least one additional arced portion is a single, second arced portion; wherein the first arced portion and the second arced portion each have a slot at a first radially-extending surface of a first end and a protrusion at a second radially-extending surface of a second end;

wherein the protrusion of the second arced portion deforms the first arced portion at the slot of the first arced portion when pressed into the slot of the first arced portion with sufficient force, and the protrusion of the first arced portion deforms the second arced portion at the slot of the second arced portion when pressed into the slot of the second arced portion with sufficient force to thereby interlock the first arced portion and the second arced portion.

11. The apparatus of claim 9, wherein the first arced portion and the second arced portion each have an inner arced surface that partially defines an inner periphery of the flux collector when the arced portions are interlocked with one another; and wherein the first arced portion and the second arced portion each extend in one axial direction at said inner arced surface to define a collar when the arced portions are interlocked with one another; wherein the axial height (H1) of the collar fits within an axial height (H2) of the groove.

12. The apparatus of claim 11, further comprising:
a valve housing defining an inner cavity having an inner diameter (D3) and a central opening at one end; wherein the central opening has a second diameter (D4) smaller than the inner diameter so that the valve housing forms a flange around the central opening;
wherein the flux collector has an outer diameter (D5) smaller than the inner diameter and larger than the central opening so that the valve body extends through the central opening and the flux collector resting against the flange of the valve housing.

13. The apparatus of claim 12, further comprising:
a pole piece, a bobbin containing a coil and surrounding the pole piece; wherein the coil is energizable to move the armature within the flux collector; wherein the valve housing is crimped to retain the flux collector, the coil, the pole piece, and the bobbin within the cavity.

14. The apparatus of claim 13, wherein an outer surface of the flux collector abuts an inner surface of the bobbin.

15. The apparatus of claim 14, wherein the collar has a tapered, frustoconical shape.

16. The apparatus of claim 7, wherein the first arced portion and the second arced portion are substantially identical.

17. A method of manufacturing a solenoid valve assembly comprising:
inserting arced portions of a flux collector into an external groove of a valve body such that the arced portions interlock with one another to encircle the valve body at the external groove and form an annular flux collector;
inserting the valve body with the flux collector thereon into a cavity of a valve housing such that the valve body extends through an opening of the valve housing and the flux collector rests on the valve housing inside the cavity; and assembling a bobbin, a coil, and a pole piece within the valve housing with an outer surface of a tapered collar of the flux collector abutting an inner surface of the bobbin that is complementary to the outer surface of the tapered collar.

18. The method of claim 17, further comprising:
turning a work-piece to form the valve body; and
cutting the groove in the valve body.

19. The method of claim 17, further comprising:
crimping the valve housing around the bobbin, the coil, the pole piece and the flux collector.

20. The apparatus if claim 17, wherein the first arced portion and the second arced portion are substantially identical.

* * * * *